(12) United States Patent
Wu et al.

(10) Patent No.: US 8,568,887 B2
(45) Date of Patent: Oct. 29, 2013

(54) HYDROPHOBIC AND OLEOPHOBIC FUSER MEMBER

(75) Inventors: Jin Wu, Pittsford, NY (US); Lanhui Zhang, Webster, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 309 days.

(21) Appl. No.: 12/948,156

(22) Filed: Nov. 17, 2010

(65) Prior Publication Data

US 2012/0121916 A1 May 17, 2012

(51) Int. Cl.
*B32B 27/06* (2006.01)
*B32B 5/00* (2006.01)
*B05D 3/02* (2006.01)
*C08L 27/12* (2006.01)

(52) U.S. Cl.
USPC ......... 428/422; 427/385.5; 399/122; 399/320

(58) Field of Classification Search
None
See application file for complete search history.

(56) References Cited

U.S. PATENT DOCUMENTS

| 5,933,695 A * | 8/1999 | Henry et al. ........... 399/333 |
| 2010/0149262 A1 * | 6/2010 | Lin et al. .............. 347/45 |

OTHER PUBLICATIONS

ChemicalBook, Hydroxy Terminated Polybutadiene, 2010, p. 1, http://www.chemicalbook.com/ChemicalProductProperty_EN_CB0274971.htm.*

* cited by examiner

*Primary Examiner* — Callie Shosho
*Assistant Examiner* — Patrick English
(74) *Attorney, Agent, or Firm* — Hoffman Warnick LLC

(57) ABSTRACT

The present teachings provide a fuser member. The fuser member includes a substrate layer and a surface layer. The surface layer includes functionalized polyfluoropolyether and functionalized polybutadiene in a weight ratio of from about 20/80 to about 80/20. A method of manufacturing the fuser member is also disclosed.

16 Claims, 3 Drawing Sheets

HYDROPHOBIC AND OLEOPHOBIC FUSER MEMBER

BACKGROUND

1. Field of Use

This disclosure is generally directed to fuser members useful in electrophotographic imaging apparatuses, including digital, image on image, and the like. In addition, the fuser member described herein can also be used in a transfix apparatus in a solid ink jet printing machine.

2. Background

Current release layers on fuser members use fluoropolymers such as fluoroplastics or fluoroelastomers. Fluoropolymers are hydrophobic; however, the oleophobic properties of fluoropolymers need improvement. Since toner is more similar to oil in nature, more topcoats that are more oleophobic are desirable for better release. In addition, current topcoats are manufactured at a high temperature for example, over 250° C. for fluoroelastomers, and over 350° C. for fluoroplastics, and preparation of topcoats is time consuming.

It would be desirable to provide release layers for fuser members that are more oleophobic and manufacturable at lower temperatures and in less time than current release layers.

SUMMARY

According to an embodiment, there is disclosed a fuser member comprising a substrate layer and a surface layer. The surface layer comprises functionalized polyfluoropolyether and functionalized polybutadiene in a weight ratio of from about 20/80 to about 80/20.

According to another embodiment, there is described a method of making a fuser member. The method includes reacting functionalized polyfluoropolyether, functionalized polybutadiene, a solvent, and a catalyst to provide a coating composition of functionalized polyfluoropolyether and functionalized polybutadiene in a weight ratio of from about 20 to 80 to about 80 to 20. The coating composition is coated on a substrate. The coating composition is cured at a temperature of from about 120° C. to about 250° C. for a period of from about 20 minutes to about 120 minutes to form a surface layer. The surface layer comprises a hexadecane contact angle of greater than about 50° a water contact angle of greater than about 90°.

According to another embodiment, there is disclosed a fuser member comprising a polyimide substrate layer, a silicone layer disposed on the substrate layer, and a surface layer disposed on the silicone layer. The surface layer has a water contact angle of greater than about 90° and a hexadecane contact angle of greater than about 50°.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
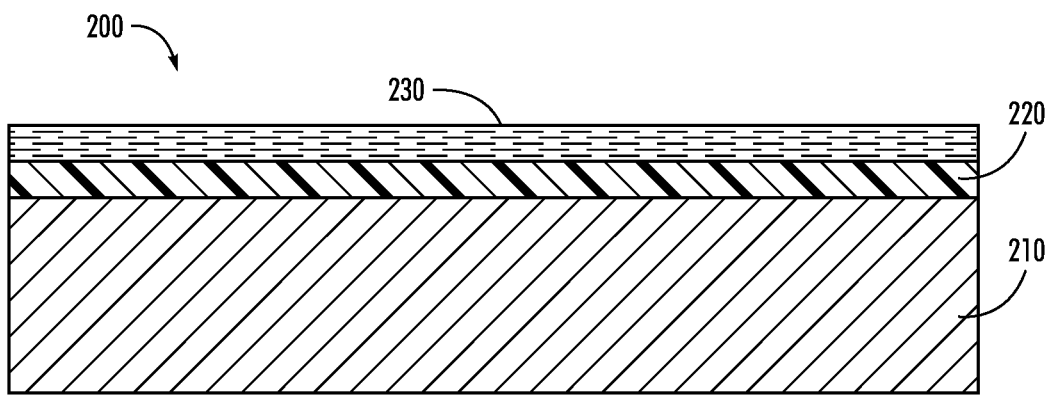
FIG. 1 depicts an exemplary fusing member in accordance with the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term "comprising." The term "at least one of" is used to mean that one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1$, $-2$, $-3$, $-10$, $-20$, $-30$, etc.

The fuser or fixing member can include a substrate having one or more functional intermediate layers formed thereon. The substrate described herein includes a belt, a roller or a drelt. The one or more intermediate layers include cushioning layers and release layers. Such fixing member can be used as an oil-less fusing member for high speed, high quality electrophotographic printing to ensure and maintain a good toner release from the fused toner image on an image supporting material (e.g., a paper sheet), and further assist paper stripping.

In various embodiments, the fixing member can include, for example, a substrate, with one or more functional intermediate layers formed thereon. The substrate can be formed in various shapes, such as a belt, a roller, or a drelt, using suitable materials that are non-conductive or conductive depending on a specific configuration, for example, as shown in FIG. 1.

In FIG. 1, the exemplary fusing member 200 can include a belt substrate 210 with one or more functional intermediate layers, e.g., 220 and an outer surface layer 230 formed thereon. The outer surface layer 230 is also referred to as a release layer. The outer surface layer is described further and is made of a functionalized polyfluoropolyether and a functionalized polybutadiene. The belt substrate 210 is described further and can be made of various polymers.

Functional Intermediate Layer

Examples of materials used for the functional intermediate layer 220 (also referred to as cushioning layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as functional intermediate layer 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B®, VITON E® VITON E 60C® VITON E430® VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177 and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF® NM® FOR-THF® FOR-TFS® TH® NH®, P757®, TNS® T439®, PL958® BR9151® and TN505® available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate layer 220 is from about 30 microns to about 1,000 microns, or from about 100 microns to about 800 microns, or from about 150 to about 500 microns.

Substrate Layer

The belt substrate 210 can be a plastic of a heat resistant resin. Examples of the heat-resistant resins with high strength include polyimides, including aromatic polyimides; polyaramides; polyether ether ketones; polyether imides; polyphthalamides; polyamide-imides; polyketones; polyphenylsulfide; fluoropoyimides; fluoropolyurethanes; polyesters and the like. The thickness of the substrate falls within a range where rigidity and flexibility enabling the fusing belt to be repeatedly turned can be compatibly established, for instance, ranging from about 10 microns to about 400 microns, or from about 20 microns to about 250 microns, or from about 30 microns to about 100 microns.

Adhesive Layer(s)

Optionally, any known and available suitable adhesive layer may be positioned between the release layer 230, the functional intermediate layer 220 and the substrate 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Release Layer or Surface Layer

The release layer disclosed herein is a hydrophobic and oleophobic fuser comprising a polyfluoropolyether (PFPE)/polybutadiene composite. The coating is obtained by reacting hydroxyl terminated PFPE with an isocyanate terminated polybutadiene under the catalysis of an organo tin compound.

Figure 2A:
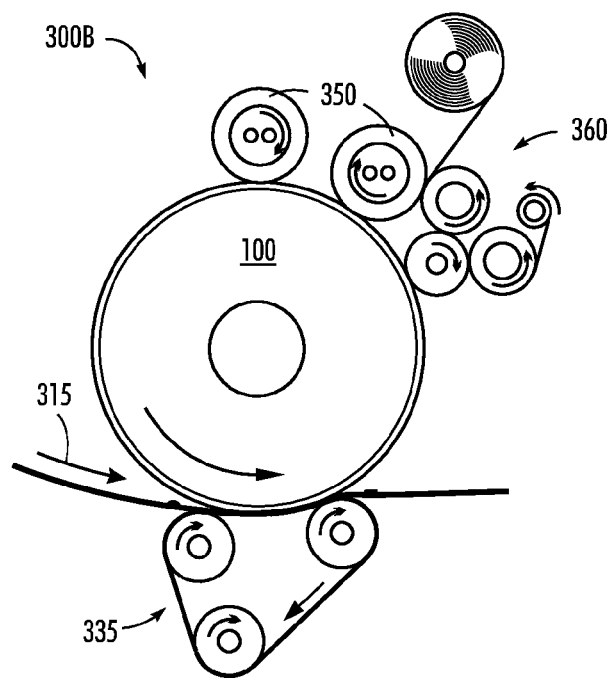
FIGS. 2A-2B depict exemplary fusing configurations using the fuser belt shown in FIG. 1 in accordance with the present teachings.
Figure 2B:
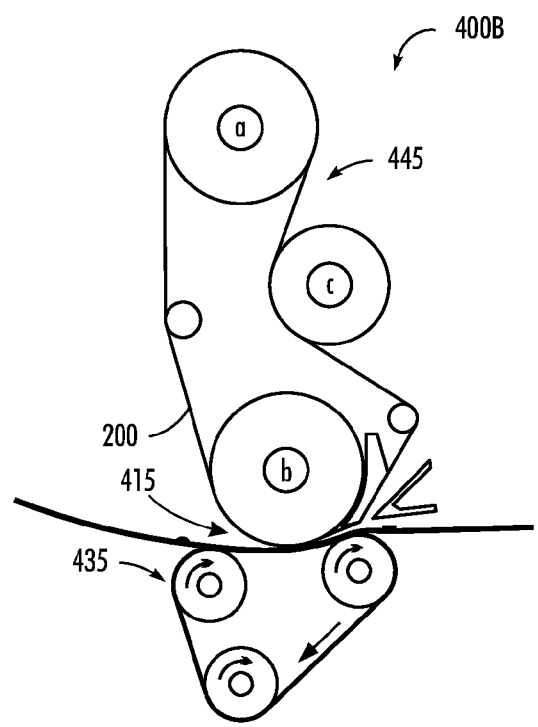

FIGS. 2A and 2B depict an exemplary fusing configuration for the fusing process in accordance with the present teachings. It should be readily apparent to one of ordinary skill in the art that the fusing configurations 300B and 400B depicted in FIGS. 2A-2B, respectively, represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIG. 2A depicts the fusing configuration 300B using a fuser member shown in FIG. 1 in accordance with the present teachings. The configuration 300B can include a fuser member of FIG. 1 that forms a fuser nip with a pressure applying mechanism 335, such as a pressure belt, for an image supporting material 315. In various embodiments, the pressure applying mechanism 335 can be used in combination with a heat lamp (not shown) to provide both the pressure and heat for the fusing process of the toner particles on the image supporting material 315. In addition, the configuration 300B can include one or more external heat rolls 350 along with, e.g., a cleaning web 360, as shown in FIG. 2A.

FIG. 2B depicts the fusing configuration 400B using a fuser member shown in FIG. 1 in accordance with the present teachings. The configuration 400B can include a fuser member (i.e., 200 of FIG. 1) that forms a fuser nip with a pressure applying mechanism 435, such as a pressure belt in FIG. 2B, for a media substrate 415. In various embodiments, the pressure applying mechanism 435 can be used in a combination with a heat lamp to provide both the pressure and heat for the fusing process of the toner particles on the media substrate 415. In addition, the configuration 400B can include a mechanical system 445 to move the fuser member 200 and thus fusing the toner particles and forming images on the media substrate 415. The mechanical system 445 can include one or more rolls 445a-c, which can also be used as heat rolls when needed.

Figure 3:
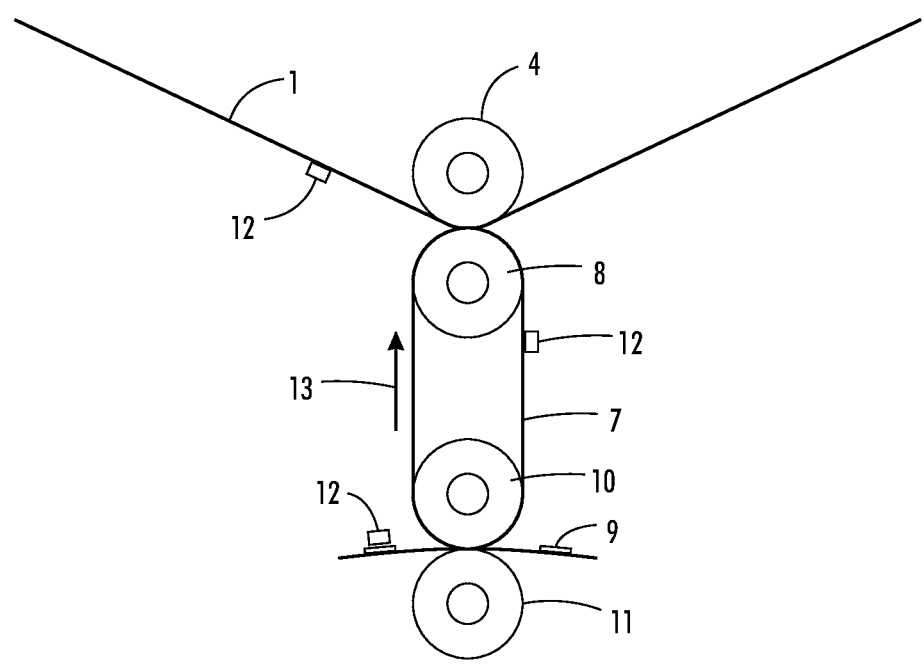
FIG. 3 depicts a fuser configuration using a transfix apparatus.

FIG. 3 demonstrates a view of an embodiment of a transfix member 7 which may be in the form of a belt, sheet, film, or like form. The transfix member 7 is constructed similarly to the fuser member described above. The developed image 12 positioned on intermediate transfer member 1, is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Described herein is a functionalized polyfluoropolyether/funtionalized polybutadiene composition suitable for use as a release layer or surface layer 230 of FIG. 1. The described herein can be prepared at low temperatures, for examples, from about 120° C. to about 250° C., or from about 130° C. to about 220° C., or from about 140° C. to about 200° C. for a short period of time, for example, from about 20 minutes to about 180 minutes, or from about 30 minutes to about 120 minutes, or from about 45 minutes to about 90 minutes, thus reducing manufacturing cost. The release layer 230 is obtained by reacting hydroxyl terminated PFPE with an isocyanate terminated polybutadiene under the catalysis of an organo tin compound. The release layer 230 exhibited a water contact angle of greater than about 90° to about 140° or from about about 100° to about 120° or greater than about 110°; and a hexadecane contact angle of from about 50° to about 120°, or from about 60° to about 90°, or greater than about 70°. As hexadecane contact angle of about 45°.

For the fuser member 200, the thickness of the outer surface layer or release layer 230 can be from about 1 micron to about 400 microns, or from about 20 microns to about 300 microns, or from about 50 microns to about 150 microns.

The surface layer 230 is prepared by coating and curing a mixture of a functionalized polyfluoropolyether (PFPE)/functionalized polybutadiene composite in a weight ratio of from about 20/80 to about 80/20, or from about 25/75 to about 60/40, or from about 30/70 to about 45/55, in a solvent on a substrate layer 210, or an intermediate layer 220. The surface layer can include particles selected from a group consisting of silicone carbide, aluminum nitride, boron nitride, aluminum oxide, graphite, graphene, copper flake, nano diamond, carbon black, carbon nanotube, metal oxide, doped metal oxide, metal flake, and mixtures thereof. The surface layer includes particles in an amount from about 1 weight percent to about 60 weight percent of the layer, or from about 5 percent to about 40 weight percent of the layer, or from about 10 percent to about 30 weight percent of the layer.

The functionalized PFPE reacts with a functionalized polybutadiene. The reaction can be promoted by using a catalyst. The reaction of the functionalized PFPE with the functionalized polybutadiene under catalysis in a solvent is conducted at from about 100° C. to about 250° C., or from about 120° C. to about 200° C., or from about 140° C. to about 175° C. for a period of from about 10 to about 120 minutes, or from about 20 to about 90 minutes, or from about 30 to about 60 minutes.

The functionalized polyfluoropolyether (PFPE) is represented by the formula below:

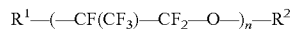

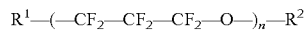

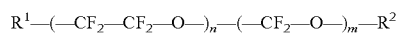

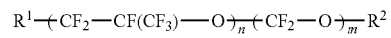

wherein n and m each represent the number of repeating groups, and n is from about 3 to about 120, or from 5 to about 80, or from about 10 to about 60; m is from about 5 to about 120, or from 5 to about 80, or from about 10 to about 60; and n+m is from about 40 to about 180, or from about 80 to about 125, n/m is from about 0.5 to about 2; $R^1$ and $R^2$ are the same or different and are independently represented by $A^1$-$CF_2O$— and —$CF_2$-$A^2$, respectively, and $A^1$, $A^2$ are independently one of

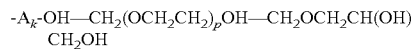

wherein $A_k$ is a bond or an alkylene group with from about 1 to 10 carbon atoms, or from about 1 to 7 carbon atoms, or from about 1 to about 5 carbon atoms; $R_H$ is H, or an alkyl group with from about 1 to about 10 carbon atoms, or from about 1 to 7 carbon atoms, or from about 1 to about 5 carbon atoms; and p is from 1 to about 20, or from about 7 to about 18, or from about 5 to about 15.

The functionalized PFPE that can be used in the coating composition include hydroxyl terminated PFPE, carboxyl acid or ester terminated PFPE, silane terminated PFPE, or phosphoric acid terminated PFPE, having a weight average molecular weight ($M_w$ as measured by DSC) of from about 100 to about 5,000, or from about 500 to about 2,000, present in an amount of from about 20 to about 80 weight percent, or from about 25 to about 60 weight percent, or from about 30 to about 45 weight percent of the coating composition.

Commercial examples of the hydroxyl terminated PFPE that can be used in the coating composition include FLUOROLINK® D ($M_w$=1,000, functional group —$CH_2OH$ and fluorine content~62%), FLUOROLINK® D10-H ($M_w$=700, functional group —$CH_2OH$ and fluorine content~61%), FLUOROLINK® D10 ($M_w$=500, functional group —$CH_2OH$ and fluorine content~60%), FLUOROLINK® E ($M_w$=1,000, functional group —$CH_2(OCH_2CH_2)_pOH$ and fluorine content~58%), FLUOROLINK® E10 ($M_w$=500, functional group —$CH_2(OCH_2CH_2)_pOH$ and fluorine content~56%), FLUOROLINK® T ($M_w$=550, functional group —$CH_2OCH_2CH(OH)CH_2OH$ and fluorine content~58%), FLUOROLINK® T10 ($M_w$=330, functional group —$CH_2OCH_2CH(OH)CH_2OH$ and fluorine content~55%) and the like and mixtures thereof, all commercially available from Ausimont USA.

Commercially available examples of the carboxyl acid or ester terminated PFPE that can be used in the coating composition include FLUOROLINK® C ($M_w$=1,000, functional group —COOH and fluorine content~61%), FLUOROLINK® L ($M_w$=1,000, functional group —COOR$_H$ and fluorine content~60%), FLUOROLINK® L10 ($M_w$=500, functional group —COOR$_H$ and fluorine content~58%), and the like and mixtures thereof, all commercially available from Ausimont USA.

Commercial examples of the silane terminated PFPE that can be used in the coating composition include FLUOROLINK® S10 ($M_w$=1,750 to 1,950, functional group -A$_k$-Si(OCH$_2$CH$_3$)$_3$), and the like and mixtures thereof, commercially available from Ausimont USA.

Examples of the phosphoric acid terminated PFPE that can be used in the coating composition include FLUOROLINK® F10 ($M_w$=2,400 to 3,100, functional group -A$_k$-OP(O)(OH)$_2$), and the like and mixtures thereof, commercially available from Ausimont USA.

The functionalized polybutadiene (PBD) that can be used in the coating composition include isocyanate PBD, hydroxyl PBD, carboxyl acid or ester PBD, or epoxy PBD, having a weight average molecular weight of from about 200 to about 10,000, or from about 500 to about 5,000, present in an amount of from about 80 to about 20 weight percent, or from about 75 to about 40 weight percent, or from about 70 to about 55 weight percent of the coating composition.

The polybutadiene (PBD) backbone of the functionalized PBD can be poly(1,3-butadiene), poly(1,4-butadiene), hydrogenated poly(1,3-butadiene), hydrogenated poly(1,4-butadiene), and mixtures thereof.

Examples of the isocyanate PBD that can be used in the coating composition include KRASOL® NN-35, NN-25, NN-22, NN-32, NN-23, NN-3A and LBD2000, all commercially available from Sartomer Company, Warrington, Pa.

Examples of the hydroxyl PBD that can be used in the coating composition include KRASOL® HLBH-P2000 (hydroxyl hydrogenated PBD), HLBH-P3000 (hydroxyl hydrogenated PBD), LBH-P2000, LBH-P3000, LBH-P5000, LBH 2000, LBH 3000, LBH 5000, LBH 10000, LBH 2040 (mercaptoethanol PBD), POLY BD® R45HT, R45M, R45HTLO, LFM, R20LM, and R30LM, all commercially available from Sartomer Company, Warrington, Pa.

Examples of the carboxyl or ester PBD that can be used in the coating composition include POLY BD® 45CT, 2000CT, 3000CT, KRASOL® LBM-32 (maleic and umaric acid half-ester PBD), and LBM-22 (maleic and umaric acid half-ester PBD), all commercially available from Sartomer Company, Warrington, Pa.

Examples of the epoxy PBD that can be used in the coating composition include POLY BD® 700, and 700E, both commercially available from Sartomer Company, Warrington, Pa.

The functionalized PFPE can chemically react with the functionalized PBD to form a crosslinked PFPE/PBD composite. For example, the hydroxyl terminated PFPE reacts with the isocyanate PBD to form the urethane linkages between the PFPE and the PBD; or the hydroxyl terminated PFPE reacts with the carboxyl or ester PBD to form the ester linkages between the PFPE and the PBD; or the hydroxyl terminated PFPE reacts with the epoxy PBD to form the ether linkages between the PFPE and the PBD; or the carboxyl or ester terminated PFPE reacts with the isocyanate PBD to form the carbamate linkages between the PFPE and the PBD; or the carboxyl or ester terminated PFPE reacts with the hydroxyl PBD to form the ester linkages between the PFPE and the PBD; or the carboxyl or ester terminated PFPE reacts with the epoxy PBD to form the ester linkages between the PFPE and the PBD; or the silane terminated PFPE reacts with the hydroxyl PBD to form the silane linkages between the PFPE and the PBD; or the phosphoric acid terminated PFPE reacts with the isocyanate PBD to form the phosphate linkages between the PFPE and the PBD; or the phosphoric acid terminated PFPE reacts with the hydroxyl PBD to form the phosphate linkages between the PFPE and the PBD; or the phosphoric acid terminated PFPE reacts with the epoxy PBD to form the phosphate linkages between the PFPE and the PBD. Among them, the combination of hydroxyl terminated PFPE/isocyanate PBD, carboxyl acid or ester terminated PFPE/hydroxyl PBD or carboxyl acid or phosphoric acid terminated PFPE/isocyanate PBD is preferred.

Suitable catalysts for the composition include organo tin catalysts such as dibutyltin laurate, acid catalysts such as p-toluenesulfonic acid, or base catalysts such as triethylamine, present in an amount of from about 0.01 to about 5 weight percent, or from about 0.1 to about 1 weight percent of the coating composition.

A particle can be dispersed in the PFPE/PBD layer. The particles can include, but are not limited to, silicone carbide, aluminum nitride, boron nitride, aluminum oxide, graphite, graphene, copper flake, nano diamond, carbon black, carbon nanotube, metal oxide, doped metal oxide, metal flake, and mixtures thereof and/or other types of conductive and semi-conductive powders.

Although most of the above functionalized PFPE and PBD are in liquid form, certain solvents can be added to the coating mixture to facilitate the mixing. Suitable solvents for the coating mixture include N,N-dimethylformamide, N-methylpyrrolidone, tetrahydrofuran, toluene, hexane, cyclohexane, heptane, N,N'-dimethylacetamide, methylene chloride and mixtures thereof, present in an amount of from about 10 to about 90 weight percent, or from about 30 to about 60 weight percent of the coating composition. When coated on a substrate followed by subsequent drying, the solvent evaporates and the functionalized PFPE/functionalized PBD crosslinks, resulting in the formation of a crosslinked PFPE/PBD coating composition.

It is theorized that since the fluoro segments (PFPE) and the hydrocarbon segments (polybutadiene) are chemically linked at the ends, macro phase separation is prevented. However, micro phase separation occurs in the coating composite, which results in a hydrophobic and oleophobic coating.

The coating mixture or solution is coated in any suitable known manner. Typical techniques for coating such materials on the substrate layer or the intermediate layer include flow coating, liquid spray coating, dip coating, wire wound rod coating, fluidized bed coating, powder coating, electrostatic spraying, sonic spraying, blade coating, molding, laminating, and the like.

For example, a coating mixture or solution can be prepared by mixing an isocyante polybutadiene, a hydroxyl terminated polyfluoropolyether, and a catalyst in a solvent such as tetrahydrofuran together for a period of from about 5 minutes to about 120 minutes, or from about 10 minutes to about 90 minutes, or from about 20 minutes to about 60 minutes. The resulting coating mixture is coated on a substrate and subsequently dried at temperatures of from about 120° C. to about 250° C., or from about 140° C. to about 220° C., or from about 160° C. to about 180° C. for a period of from about 10 minutes to about 120 minutes, or from about 20 minutes to about 90 minutes, or from about 30 minutes to about 60 minutes.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Hydroxyl terminated PFPE (Fluorolink® D, Ausimont USA) was mixed with isocyanate polybutadiene (Krasol®

NN-35, Sartomer) in a weight ratio of 30/70 in tetrahydrofuran (THF). Small amounts of the tin catalyst dibutyltin laurate were added to accelerate the crosslinking reaction between the hydroxyl PFPE and the isocyanate polybutadiene (PBD). The coating mixture was coated on a polyimide film. After curing at 150° C. fore 30 minutes the cured mixture forming a topcoat possessed a water contact angle of about 112°±1°, and a hexadecane contact angle of about 70°±1°. As comparison, a PTFE, or VITON or PFA topcoat exhibits a water contact angle of about 110°, and a hexadecane contact angle of about 45°. Strong adhesion was observed between the topcoat and the polyimide film with no peel from our standard adhesion test. It is expected that the disclosed topcoat should possess better toner release properties than current VITON or PFA topcoat due to the about 25° higher hexadecane contact angle.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:
   a substrate layer comprising a heat resistant resin selected from the group consisting of: polyimides, polyaramides, polyether ether ketones, polyether imides, polyphthalamides, polyamide-imides, polyketones; polyphenylsulfide, fluoropolyimides, fluoropolyurethanes and polyesters; and
   a surface layer disposed on the substrate layer comprising a polymer consisting of functionalized polyfluoropolyether and functionalized polybutadiene, wherein the functionalized butadiene is selected from the group consisting of: an isocyanate polybutadiene, a hydroxyl polybutadiene, a carboxyl acid polybutadiene, an ester polybutadiene, and an epoxy polybutadiene and wherein said polybutadiene is selected from the group consisting of: poly(1,3-butadiene), poly(1,4-butadiene), hydrogenated poly(1,3-butadiene) and hydrogenated poly(1,4-butadiene), wherein a weight ratio of functionalized polyfluoropolyether/functionalized polybutadiene is of from about 20/80 to about 80/20
   wherein the fuser member fuses toner particles and forms images on a media substrate.

2. The fuser member of claim 1 wherein the functionalized polyfluoropolyether is represented by:

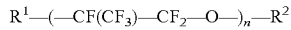

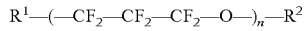

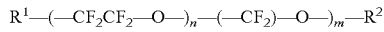

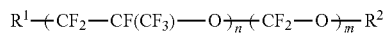

wherein n and m each represent the number of repeating groups, n is from about 3 to about 120, m is from about 5 to about 120, n+m is from about 40 to about 180, n/m is from about 0.5 to about 2, $R^1$ and $R^2$ are independently represented by $A^1$-$CF_2$O— and —$CF_2$-$A^2$, respectively, $A^1$, $A^2$ are independently one of

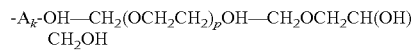

wherein $A_k$ is a bond or an alkylene group with from about 1 to about 10 carbon atoms, $R_H$ is H, or an alkyl group with from about 1 to about 10 carbon atoms; and p is from 1 to about 20.

3. The fuser member of claim 1 wherein the functionalized polyfluoropolyether is selected from the group consisting of a hydroxyl terminated polyfluoropolyether, a carboxyl acid terminated polyfluoropolyether, an ester terminated polyfluoropolyether, a silane terminated polyfluoropolyether, and a phosphoric acid terminated polyfluoropolyether.

4. The fuser member of claim 1 wherein the surface layer comprises a hexadecane contact angle of greater than about 50°.

5. The fuser member of claim 1, wherein the surface layer further comprises conductive particles in an amount of from about 1 to about 60 weight percent based on total weight of the surface layer.

6. The fuser member of claim 5 wherein the conductive particles are selected from the group consisting of silicone carbide, aluminum nitride, boron nitride, aluminum oxide, graphite, graphene, copper flake, nano diamond, carbon black, carbon nanotube, metal oxide, doped metal oxide, metal flake, and mixtures thereof.

7. The fuser member of claim 1 wherein the surface layer has a thickness of from about 1 micron to about 400 microns.

8. A method of making a fuser member comprising:
   a) reacting a mixture consisting of functionalized polyfluoropolyether, functionalized polybutadiene wherein the functionalized butadiene is selected from the group consisting of: an isocyanate polybutadiene, a hydroxyl polybutadiene, a carboxyl acid polybutadiene, an ester polybutadiene, and an epoxy polybutadiene and wherein said polybutadiene is selected from the group consisting of: poly(1,3-butadiene), poly(1,4-butadiene), hydrogenated poly(1,3-butadiene) and hydrogenated poly(1,4-butadiene), a solvent, optional conductive particles, and a catalyst to provide a coating composition of functionalized polyfluoropolyether and functionalized polybutadiene in a weight ratio of from about 20 to 80 to about 80 to 20;
   b) coating the coating composition on a substrate comprising a heat resistant resin selected from the group consisting of: polyimides, polyaramides, polyether ether ketones, polyether imides, polyphthalamides, polyamide-imides, polyketones; polyphenylsulfide, fluoropolyimides, fluoropolyurethanes and polyesters; and
   c) curing the coating composition at a temperature of from about 120° C. to about 250° C. for a period of from about 20 minutes to about 120 minutes to form a surface layer wherein the surface layer comprises a hexadecane contact angle of greater than about 50° a water contact angle of greater than about 90°, wherein the fuser member fuses toner particles and forms images on a media substrate.

9. The method of claim 8 wherein the catalyst is selected from the group consisting of an organotin compound, an acid catalyst, and a base catalyst.

10. The method of claim 8 wherein the catalyst is present in an amount from about 0.01 weight percent to about 5.0 weight percent of the coating composition.

11. The method of claim 8 wherein the solvent is selected from the group consisting of N,N-dimethylformamide, N-methylpyrrolidone, tetrahydrofuran, toluene, hexane, cyclohexane, heptane, N,N'-dimethylacetamide, methylene chloride and mixtures thereof.

12. The method of claim 8 wherein the solvent is present in an amount from about 10 weight percent to about 90 weight percent of the coating composition.

13. The method of claim 7 wherein the functionalized polyfluoropolyether is represented by:

$$R^1-(-CF(CF_3)-CF_2-O-)_n-R^2$$

$$R^1-(-CF_2-CF_2-CF_2-O-)_n-R^2$$

$$R^1-(-CF_2CF_2-O-)_n-(-CF_2)-O-)_m-R^2$$

$$R^1-(-CF_2-CF(CF_3)-O-)_n-(-CF_2-O-)_m-R^2$$

wherein n and m each represent the number of repeating groups, n is from about 3 to about 120, m is from about 5 to about 120, n+m is from about 40 to about 180, n/m is from about 0.5 to about 2, $R^1$ and $R^2$ are independently represented by $A^1$-$CF_2O$— and —$CF_2$-$A^2$, respectively, $A^1$, $A^2$ are independently one of -$A_k$-OH—$CH_2(OCH_2CH_2)_p$OH—$CH_2OCH_2CH(OH)$
$CH_2OH$ —$COOR_H$-$A_k$-$Si(OR_H)_3$-$A_k$-$OP(O)(OH)_2$ wherein $A_k$ is a bond or an alkylene group with from about 1 to about 10 carbon atoms, $R_H$ is H, or an alkyl group with from about 1 to about 10 carbon atoms, and p is from 1 to about 20.

14. The method of claim 8 wherein the functionalized polyfluoropolyether comprises a material selected from the group consisting of hydroxyl terminated polyfluoropolyether, a carboxyl acid terminated polyfluoropolyether, an ester terminated polyfluoropolyether, a silane terminated polyfluoropolyether, and a phosphoric acid terminated polyfluoropolyether.

15. The method of claim 8 wherein the substrate comprises a polyimide.

16. A fuser member comprising:
a substrate layer comprising polyimide;
a silicone layer disposed on the substrate; and
a surface layer disposed on the silicone layer, wherein the surface layer comprises a polymer consisting of functionalized polyfluoropolyether and functionalized polybutadiene, wherein the functionalized butadiene is selected from the group consisting of: an isocyanate polybutadiene, a hydroxyl polybutadiene, a carboxyl acid polybutadiene, an ester polybutadiene, and an epoxy polybutadiene and wherein said polybutadiene is selected from the group consisting of: poly(1,3-butadiene), poly(1,4-butadiene), hydrogenated poly(1,3-butadiene) and hydrogenated poly(1,4-butadiene), wherein a weight ratio of functionalized polyfluoropolyether/functionalized polybutadiene is from about 20/80 to about 80/20, wherein the surface layer further comprises conductive particles in an amount of from about 1 to about 60 weight percent based on a total weight of the surface layer and wherein the surface layer has a water contact angle of greater than about 90° and a hexadecane contact angle of greater than about 50°, wherein the fuser member fuses toner particles and forms images on a media substrate.

\* \* \* \* \*